United States Patent [19]
Gerstel et al.

[11] Patent Number: 5,793,746
[45] Date of Patent: Aug. 11, 1998

[54] FAULT-TOLERANT MULTICHANNEL MULTIPLEXER RING CONFIGURATION

[75] Inventors: Ornan Alexander Gerstel, Riverdale; Rajiv Ramaswami, Ossining, both of N.Y.

[73] Assignee: International Business Machines Corporation, Armonk, N.Y.

[21] Appl. No.: 639,454

[22] Filed: Apr. 29, 1996

[51] Int. Cl.$^6$ .................................................. H04L 1/22
[52] U.S. Cl. ......................... 370/228; 370/248; 370/250; 370/258; 371/20.6
[58] Field of Search .................................... 370/241–245, 370/216–222, 225–228, 248–252, 258, 249, 427; 340/825.01, 827; 359/110, 115, 117, 118, 119; 371/20.1, 202, 20.6; 379/5

[56] References Cited

U.S. PATENT DOCUMENTS

| | | | |
|---|---|---|---|
| 4,601,028 | 7/1986 | Huffman et al. | 370/249 |
| 4,631,719 | 12/1986 | Huffman et al. | 370/249 |
| 4,675,862 | 6/1987 | Banzi, Jr. et al. | 370/249 |
| 5,440,538 | 8/1995 | Olaen | 370/228 |
| 5,515,361 | 5/1996 | Li et al. | 370/249 |

*Primary Examiner*—Benedict V. Safourek
*Assistant Examiner*—Seema S. Rao
*Attorney, Agent, or Firm*—Douglas W. Cameron; Louis P. Herzberg

[57] ABSTRACT

A wiring scheme for providing loop-back capability for individual failed channels around a ring network composed of nodes with limited space-switching. With this invention each node has a switch for interconnecting channels between incident links of the node. Each secure channel i has a backup channel B(i). In the normal mode of operation, the switch is configured so that the ports for channel B(i) of the incident links are connected to each other. Upon failure of channel i in one of the incident links of the node, the port for channel i of the failed link is connected to the port for channel B(i) on the other incident link of the node. With this invention when there is a failure of channel i on one of the links, the connection using this failed channel can be restored by switch configurations at only two nodes of the ring since the backup channels at the other nodes are already connected to each other.

12 Claims, 5 Drawing Sheets

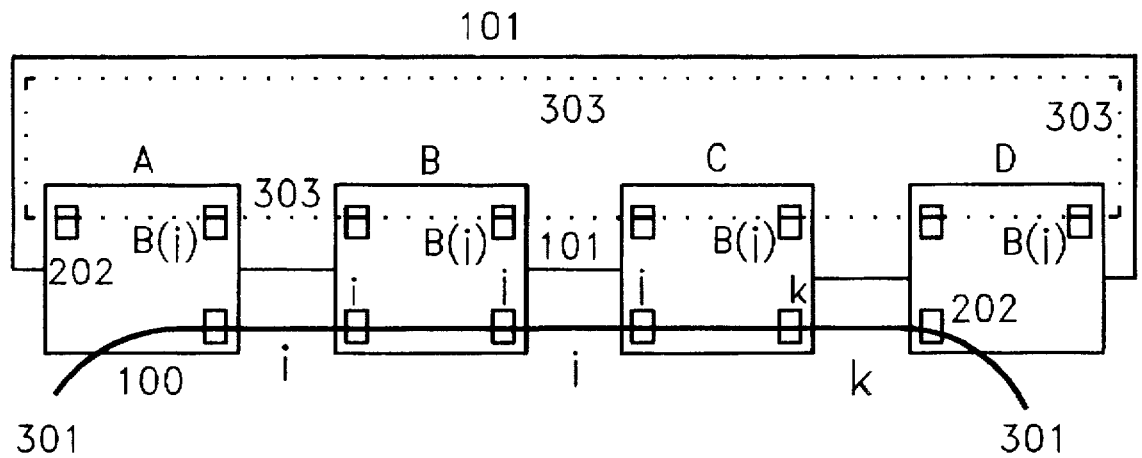
FIG.3A  NORMAL OPERATION MODE
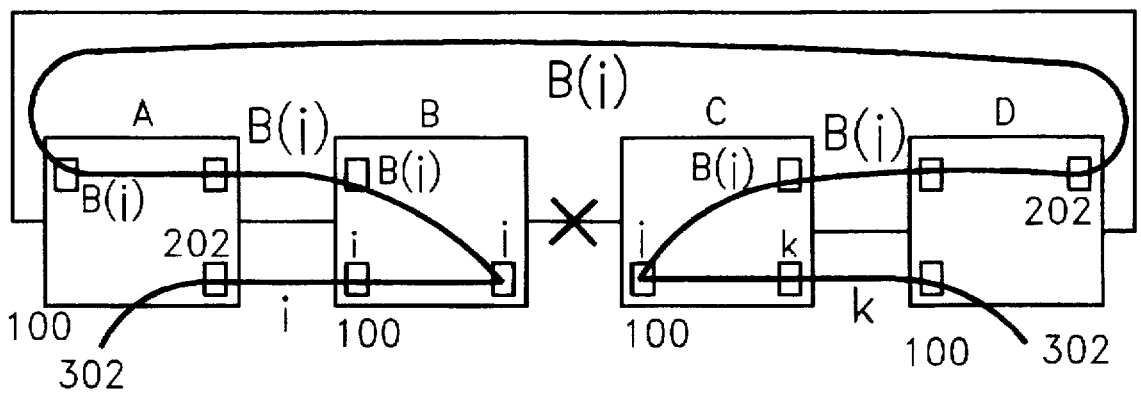
FIG.3B  CONNECTION RESTORED

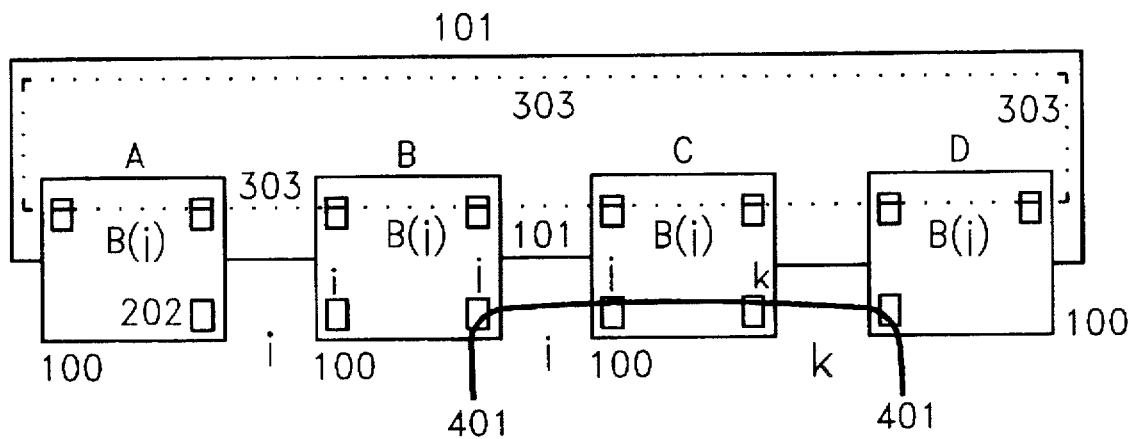
FIG. 4A  NORMAL OPERATION MODE
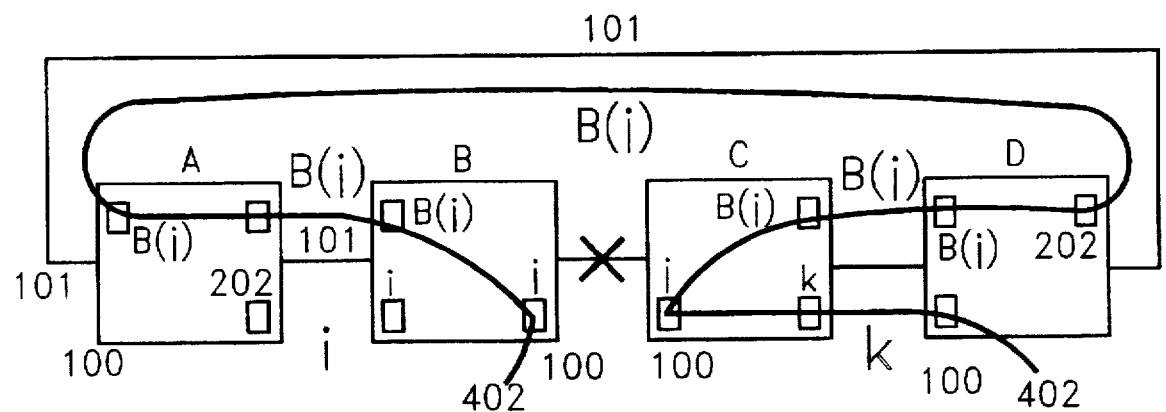
FIG. 4B  CONNECTION RESTORED

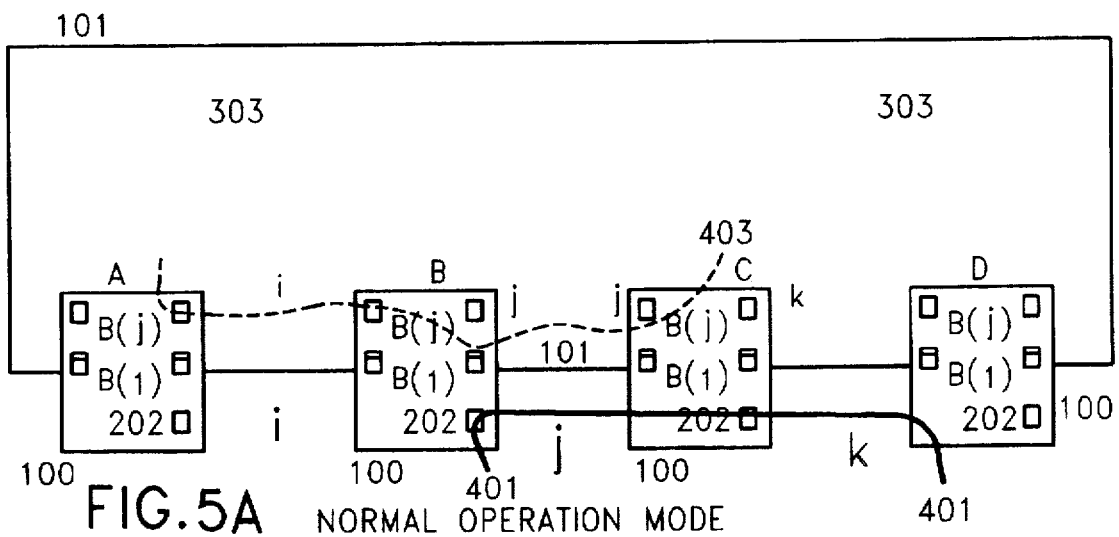
FIG.5A  NORMAL OPERATION MODE
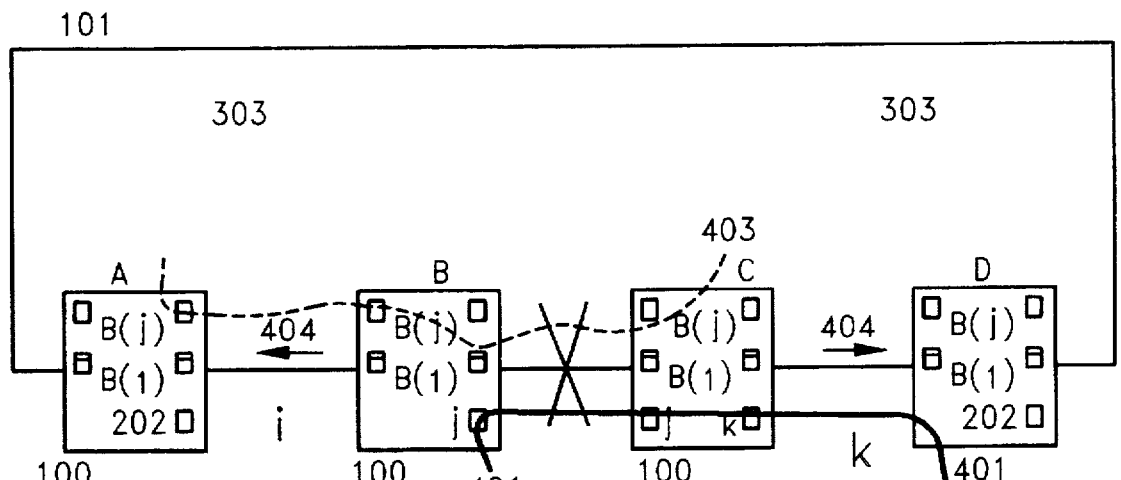
FIG.5B  A BEACON IS SENT UPON DETECTION OF FAILURE
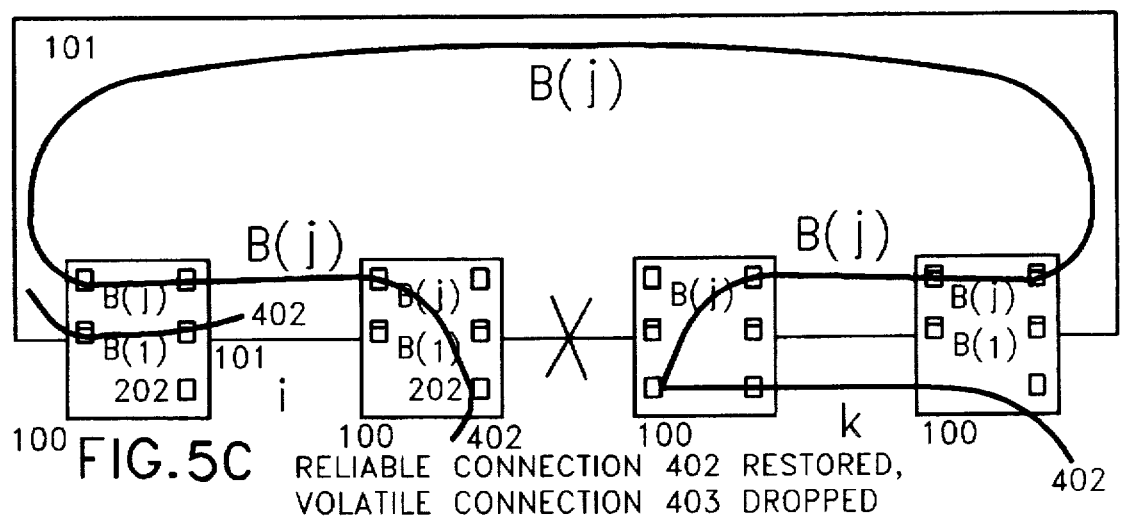
FIG.5C  RELIABLE CONNECTION 402 RESTORED, VOLATILE CONNECTION 403 DROPPED

FAULT-TOLERANT MULTICHANNEL MULTIPLEXER RING CONFIGURATION

This invention was made with Government Support under MDA-972-92-C0075 awarded by the Advanced Research Project Agency. The Government has certain rights in this invention.

TECHNICAL FIELD

The present invention relates generally to proving fault tolerance on ring networks composed of point-to-point transmission systems employing multiple channels and connected at each site via space switching (as opposed to time-based switching as in SONET) between the channels. More specifically, it relates to optical wavelength-division-multiplexed multichannel links connected in a ring, with limited switching of channels at the nodes.

DESCRIPTION OF PRIOR ART

A multichannel multiplexor multiplexes a number of input channels, say N, onto a transmission medium (e.g., a fiber) for economic transmission. One such example is the IBM MuxMaster Optical Fiber Multiplexor [1]. Reference [1] is hereby incorporated herein by reference. Associated with each input channel is a line card. Multiplexors can be connected in a ring configuration across multiple sites (herein called nodes). Each node consists of a pair of multiplexors, one for each link on the ring. This allows provisioning a number of channels between any nodes according to their traffic requirements. At any time, a link between two nodes may fail. In this case we would like to reroute the traffic that uses this link along the alternate path on the ring. Also one or more channels in the multiplexor may fail. Again we would like to reroute the traffic that uses these channels along the alternate path. For practical purposes, it is imperative that the wiring configuration at each node be independent of the actual routing of connections at the node, and that it uses a small number of switch ports for backup purposes (a single port per switch in our case).

The prior art cited below deals extensively with handling failures in ring networks. In particular, most of the art considers 4-fiber rings with 2 working fibers and 2 protection fibers, or 2-fiber rings with both fibers being working fibers but each fiber having 50% spare capacity to serve as a protection fiber for the other fiber should it be cut. The art teaches how to effect a "loopback" configuration if a link is cut or a node fails. However the prior art suggests to reroute all data from a link in a bulk, and does not deal with rerouting of single connections in the event of single channel failures in a multichannel ring network. Thus, prior art cannot handle multiple events of failing channels, while the current invention supports this scenario, provided that the failing channels do not use the same backup channels. In doing so in an environment of restricted conversion between channels at each node, new difficulties arise, primarily because a connection may use different channels on each link in its path with a node capable of switching a connection from a channel on one of its links to another channel on its other link.

Furthermore, much of the prior art assumes that the channels on each link are time-multiplexed. Thus, switching between channels merely requires a rearrangement of the time slots, while the current invention supports the case of frequency/wavelength multiplexed channels, which arrive at the node on different ports. In this case, connections must be space-switched to the output ports, requiring a wiring scheme from the input ports, via space-switches, to the output ports.

Our invention is concerned with rerouting said connections through protection channels (possibly on the same fiber), by means of said wiring scheme, on a channel by channel basis, with very quick reaction time.

U.S. Pat. No. 5,475,676 "Switch for self-healing ring" considers a 4-fiber ring with 2 working fibers and 2 protection fibers. It proposes a technique and a node architecture for connecting the working fiber(s) to the backup fiber(s) in the event of a working fiber cut. This patent cannot handle the rerouting of failures for connections as defined in this invention. It cannot also handle rerouting of multiple channels (or equivalently multiple fibers) without scaling up the space-division-switch size proportionally.

U.S. Pat. No. 5,442,620 "Apparatus and method for preventing communications circuit misconnections in a bidirectional line-switched ring transmission system" considers either a 4-fiber ring as before or a 2-fiber ring with both fibers working but having 50% spare capacity. This patent cannot handle the rerouting of failures for individual connections as described in the instant application. It cannot also handle rerouting of multiple channels (or equivalently multiple fibers) without scaling up the space-division-switch size proportionally. Moreover before the rerouting is effected, this patent requires the nodes at the ends of the failed link to send messages to each other through the other path along the ring, which increases the response time to failures.

U.S. Pat. No. 4,633,246 "Time-division multiplex ring" proposes a specific node architecture for a 2-fiber ring and techniques for communicating alarms between nodes in response to failures. This patent cannot handle the rerouting of failures for individual connections based on space switching, as defined in the instant application.

Japan Patents 63-161748 and 53-68046 "Automatic avoiding system for loop network fault" and "Loop-type data highway system" also consider a similar node architecture and propose simplified techniques for nodes to enter a loopback configuration upon detecting a failure. These patents cannot handle the rerouting of failures for individual connections based on space switching, as defined in this instant application.

U.S. Pat. No. 5,406,401 "Apparatus and method for selective tributary switching in a bidirectional ring transmission system" teaches a method for selectively doing protection switching for some communication circuits and leaving others unprotected in a ring network, in the event of failures. However it does not teach how to reroute connections that are space-switched in each node. In particular, it does not teach how to wire the switches and channel ports in a WDM node to support the rerouting of connections, in case said connections use different channels along their paths.

U.S. Pat. No. 5,159,595 "Ring transmission system" also considers a two-fiber ring network. It proposes a node configuration that uses two unidirectional transmission paths in opposite directions to communicate between a pair of nodes in a ring, along a shortest path. When a failure occurs, the connections are switched to the alternate, longer path. The patent assumes that all channels in the transmission path are rerouted together.

Furthermore, it cannot handle connections that use different channels on each link.

Japan Patent 3-107242 "Ring reconstitution methods for network system" proposes a means for healing a ring using a protection ring, in which the beacon process for the detection of the fault is simplified. The patent does not apply to the case when only some of the connections require rerouting, or to the case when said connections are routed using different channels along the ring.

U.S. Pat. No. 5,412,652 "SONET ring subnetwork management method" proposes a distributed management mechanism for SONET. The patent does not suggest a means for rerouting connections upon a failure when the connections are space-switched in each node, and use different channels along their path.

U.S. Pat. No. 5,333,130 "Self-healing drop and insert communication network" proposes a method for improving a time-multiplexed drop and insert network, by connecting its end points to form a ring. The patent does not teach how to reroute connections that are space-switched in each node. In particular, it does not teach how to wire the switches and channel ports in a WDM node to support the rerouting of connections, in case said connections use different channels along their paths.

U.S. Pat. No. 5,341,364 "Distributed switching in bidirectional multiplex section-switched ring transmission systems" proposes a means for distributing the management data and for recovering connections around a ring by using shortest paths in the remaining network after a failure. The patent assumes a TDM (time-switched) multiplexing system and does not teach how to wire the switches and channel ports in a WDM node to support the rerouting of connections, in case said connections use different channels along their paths.

SUMMARY OF THE INVENTION

The present invention describes a method for wiring a node in a multichannel ring network and for rerouting traffic in response to a link or channel failure(s) in the ring.

For efficient routing, the invention further provides a limited amount of switching in the line cards. Specifically each line card is provided with a switch that connects the input either to the link port (for transmission on the link) or to one of $\Delta$ other local ports. A switch can also connect a local port to either the link port or another local port. Each port can be connected with only one other port at any given time. A node consists of two multiplexors, each with N line cards, connected back-to-back. A local port on one line card may be connected to the local port on another line card either in the same multiplexor or in the other multiplexor.

The invention suggests to allocate up to half of the line cards for backup channels and to connect each secure (fault tolerant) data channel to a single corresponding backup channel. Insecure (fault sensitive) data channels are not associated with backup channels. The backup channels of the same data channel in the two multiplexers that comprise a node are wired to each other, and their switches are pre-configured to enable the latter connection.

When a single channel fails, the connection that uses it (either from an external source or from another channel, in the other multiplexor that comprises the node) undergoes up to two restoration phases. In the first phase, termed local restoration, the traffic is diverted by the switch of the line card to the corresponding backup channel of the other line.

An identical procedure is repeated on the other side of the faulty channel, causing the connection to wrap around the ring using the pre-configured backup channels. When a full line crashes, the application of the above procedure for each channel separately, will result in a restoration of all connections that are using the faulty line.

The invention further proposes that the above procedure be applied locally at each node, thus reducing the reaction time for restoring the connections. This process will be controlled by the network management entity (be it centralized or distributed) so that if a second failure occurs shortly after the first one, it will not disrupt the already recovered connections from the first fault.

The key idea behind this invention is the following. Suppose that a connection c is switched by a node n from channel x on one link $L_1$ to channel y on the other link $L_2$, via switch $s_x$ (attached to channel x) and $s_y$ (attached to channel y). If channel y fails (individually or as part of a failure of link $L_2$) then c should be looped-back onto link $L_1$. To this end, the node must be reconfigured to direct the data from channel x to some other channel z on $L_1$. This invention proposes to assign a backup (protection) channel B(i) to each channel i and to divert the data of the failing channel y, back to B(y) on link $L_1$ by means of an extra port in the switch $s_y$, which is wired to B(y), and by reconfiguring $s_y$ to connect the currently active local port to B(y) rather than to y. At the other end of link $L_2$, a similar step is taken, thereby diverting the connection c to the same backup channel B(y). To complete the picture, at each other node (in which B(y) is not used) B(y) on one link is connected to B(y) on the other link by the default setting of their attached switches.

A central object of the main embodiment of the invention is to enable fast restoration from link failures with no communication between nodes. It is the object of another embodiment of this invention to minimize communication between nodes and reaction time required to recover form a failure, while improving the utilization of channels by enabling the use of backup channels for low-priority connections when there are no failures.

BRIEF DESCRIPTION OF THE DRAWINGS

FIG. 3A and FIG. 3B Show the setting of switching elements in the ring for supporting a connection AD in default operation mode, and the setting of switches after a failure.

FIG. 4A and FIG. 4B Show the setting of switching elements in the ring for supporting a connection BD in default operation mode, and the setting of switching elements after a failure.

FIG. 5A–FIG. C Show the configuration of a system that supports low-priority connections in addition to the regular connections.

DESCRIPTION OF THE PREFERRED EMBODIMENT

Figure 1:
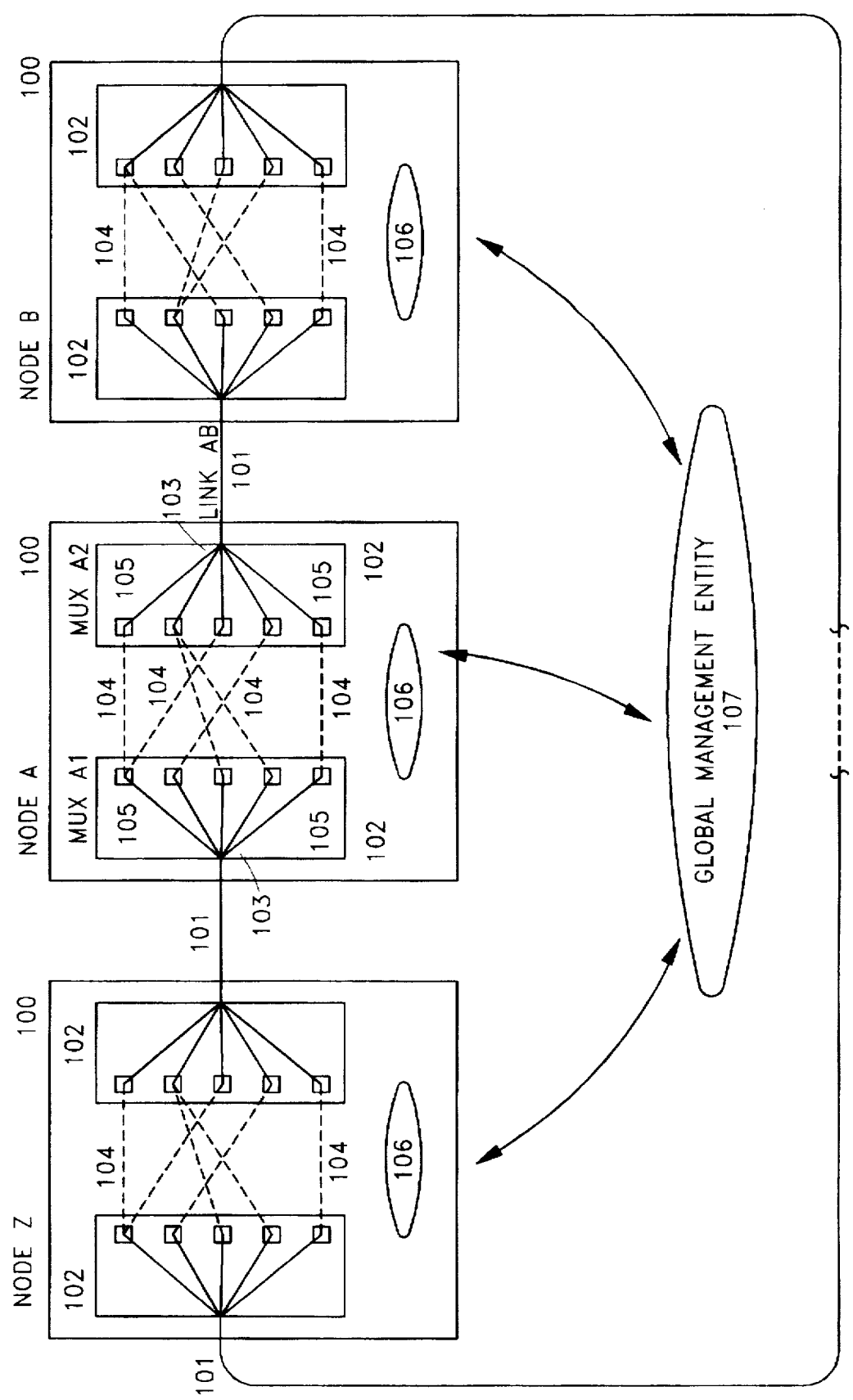
FIG. 1 Shows a block diagram of a node, and how nodes are connected in a ring.

FIG. 1 shows the nodes 100 composing a ring network. Each pair of said nodes is connected by a transmission link 101 (e.g., Link AB in the figure) so that each node is connected to a pair of links 101 referred to as incident links. Each node 100 is composed of two multiplexors 102 (e.g., Node A in the figure is composed of Mux-AB and Mux-AZ).

where each of said multiplexors is composed of a multiplexing device 103 and a plurality of line cards 105 (one line card per multiplexed channel). The line cards 105 of said multiplexors are connected to each other inside the node via wires 104. Each node has a local management entity 106 (such as an SNMP/CMIP agent realized on a standard processor, e.g., Pentium) which receives data from the components of the node (e.g., the channels, the multiplexing device, the line cards) and signals to them requests for configuration changes (in particular, to the switching elements). In addition, a global management entity 107 is assumed, that receives inputs from said local management entities of the nodes, and sends them configuration change requests. The global management entity can be realized using tools known in the art, as IBM/NetView software, connecting the local management entities by the SNMP protocol. Such an entity can be realized in a distributed manner as well.

Figure 2:
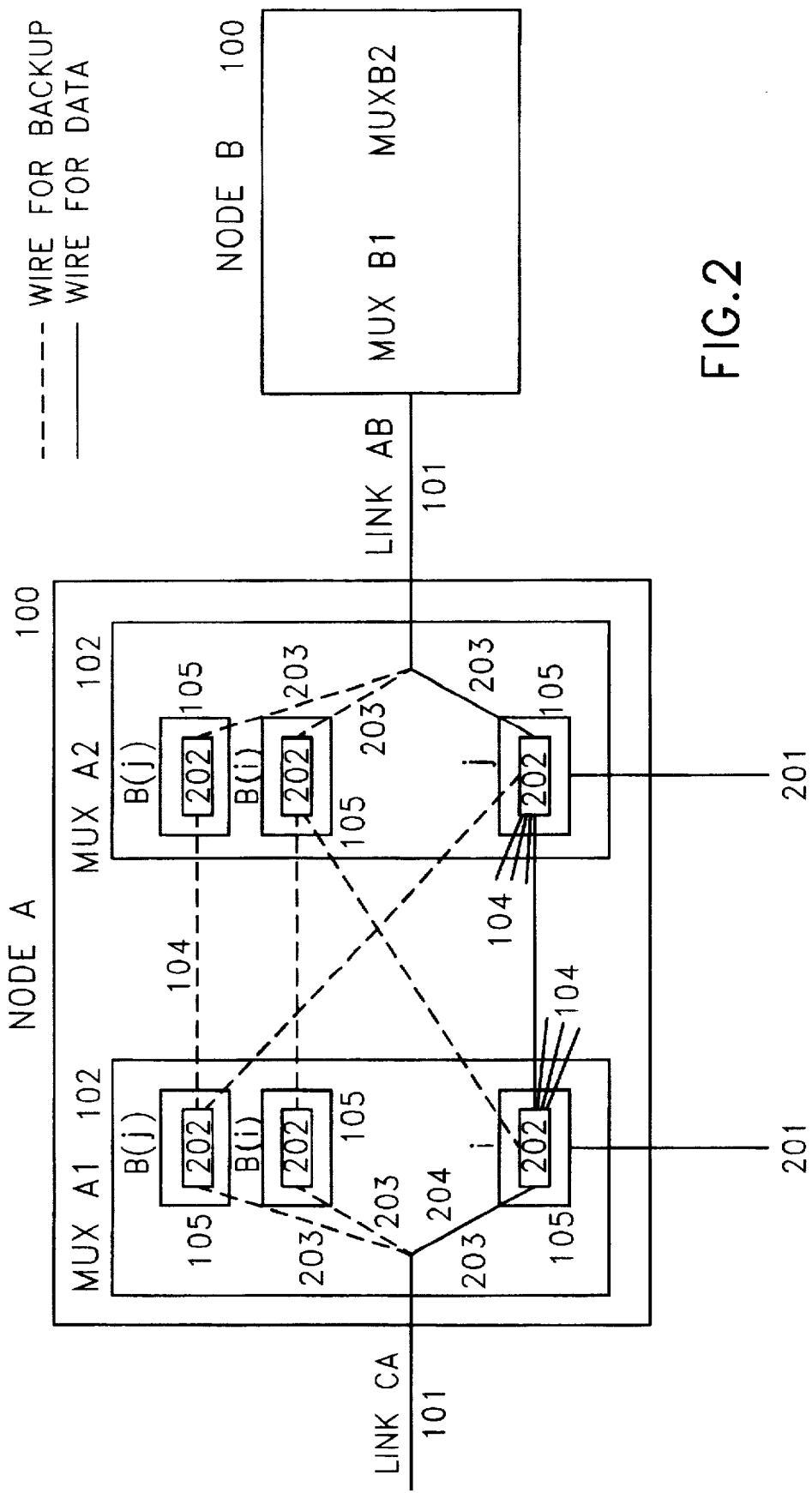
FIG. 2 Shows the wiring configuration inside a node.

Referring to FIG. 2, each line card is associated with a switching element 202 of limited degree Δ. This element is used to direct the data from the multiplexing device port 204 to an external I/O port 201 of the node, or to some other "local" port in the other multiplexor (via 104). The term "switch" is used to refer to a collection of switching elements in a node. On each channel, there exists a sensor 203, which senses the absence of signal on the channel. The sensor 203 is can be realised by a photo-diode or some other light detector device well known in the art, for the case of WDM. This sensor is part of the line cards 105, but is not shown in all the line cards for the sake of simplicity.

Node Configuration

We propose to partition the N channels into three disjoint subsets: non-secure data-channels, secure (fault tolerant) data-channels, and backup (spare) channels.

Each secure data-channel i is associated with a backup channel B(i). For example, B may be a function mapping any channel i to a unique backup channel B(i). In each said secure line card we will use Δ−1 local ports to connect it (via 104) to other data-channel line cards. Only a single port is used for backup purposes. At non-secure data-channel line cards all Δ local ports are used for connections to other data-channel line cards, and will not be discussed below for simplicity.

Referring to FIG. 2, the local ports are wired (via 104) as follows

1. Each secure data-channel line card 105 in multiplexor A1, i, is hard-wired to backup-channel line card B(i) in multiplexor A2.
2. Each secure data-channel line card 105 in multiplexor A2, j, is hard-wired to backup-channel line card B(j) in multiplexor A1.
3. Backup-channel line card 105 in multiplexor A1, B(i), is hard-wired to the backup-channel line card B(i) in multiplexor A2.
4. All the other Δ−1 available ports of each line card's switching element are hardwired to any other line card (as determined by considerations beyond the scope of this invention).

The initial (default operation mode) setting of the switching element 202 in each backup-channel line card B(i) in one multiplexor 102 in each node 100, connects the line port (carrying data from the multiplexor device 103), to the local port of the backup-channel line card B(i) at the other multiplexor 102 in the node.

The default operation mode setting of the switching element 202 in each data-line card is determined according to considerations beyond the scope of the instant application, at each point in time, by the routing requirements of connections that are currently present in the system, and is implemented in the system by the global management entity 107.

Restoration of connections

To illustrate how the failure recovery works, refer to the 4-node ring network in FIG. 3. FIG. 3A shows a network in default operation mode, and a connection 301 between node A and node D, carried on channels i, j, and k on links AB, BC, and CD respectively. Also shown in the figure is the configuration of the B(j) switching elements in each node in the system, creating a loop 303. For simplicity, the figure shows only the switching elements 202 (without specifying the 104 wires, line-cards etc.).

Referring to FIG. 3B, suppose link BC fails (or only channel j on said link). This is immediately detected by the channel sensor 203 on the ends of the link (e.g., by the loss of light), and signaled to the local management entity 106 of nodes B and C. The local management entity changes the setting of the switching elements at nodes B and C as follows (the boxes at FIG. 3B represent switching elements 202 which are involved in the change). The switching element of channel j on link BC is configured to connect the local port from channel i to channel B(j) on link AB rather than to the line port (inside node B). As a result, the data from channel i on link AB is diverted to the backup channel B(j) on the same link rather than to the faulty link. The connection from AD now loops around the ring, using B(j) to B(j) connections (see 303 of FIG. 3A) inside each node, as shown in FIG. 3B, through node D to node C. At node C it is routed to the switching element of channel j of link BC, from which it is routed to channel k on link CD. The connection is received at D as before.

Referring to FIG. 4A–FIG. 4B, another case is demonstrated by connection BD (402). Upon a failure of channel j (individually or as part of a failure of link BC), the switching element of channel j, which in default operation, switches the data from the input line 201 to the multiplexor device 103, now switches the data from said input line to backup channel switching element B(j). See FIG. 4B. The rest of the details are identical to those of FIG. 3.

More generally, the switching element of a faulty channel j on incident link BC of node B diverts the data of a connection from being transmitted to the link BC, onto channel B(j) of incident link AB. Simultaneously node C executes the symmetric algorithm (that is, diverts the connection from channel j of link BC onto channel B(j) of link CD). Note that the procedure may be applied once in case of a single line card failure or multiple times in case the whole link has failed.

Management of backup channels

Since local restoration does not require any message exchange between the nodes, it can be independently performed by a local network management entity in the nodes at the end of the failed link. This independent decision expedites the restoration process and does not depend on the availability of the global network management entity (this is especially important if the global entity is centralized). For proper operation under failures of channels on multiple links, the local restoration operation uses one of the following mechanisms: (1) Sensing the channels to find out if they are utilized, (2) Local flags managed by the global management entity.

In the first alternative, the usage of backup channel B(i) is determined by sensing B(i), to see if it is currently used. An active channel always has some high frequency signal on it, even when no data is transmitted, in the form of a clock, which can be sensed using a filter. B(i) will be used for backing up a connection only if the node that discovers the failure does not sense that B(i) is currently active.

In the second alternative, the usage of backup channels is controlled by local flags at each node. For each backup channel B(i), the flag FreeChan[B(i)] determines if local restoration is possible through backup channel B(i). The initial value of all flags is True, thereby enabling local restoration through any backup channel. Immediately after local restoration of channel B(i) takes place, the local management entity 106 notifies the global management entity 107, which sets the flags FreeChan[B(i)] in all the nodes around the ring to False (by notifying their local management entities). If the same channel i fails at some other point on the ring, it is not restored.

Next, after some threshold has been crossed (e.g., more than y local restorations have occurred, or y time has elapsed since a local restoration has occurred) the global management entity 107 considers the sources and destinations of the restored connections and recomputes optimal routes for each of them (based on any offline algorithm known in the art). This process is termed global restoration. For example, refer to FIG. 3, in which a more optimal route for connection AB would involve nodes A and D exclusively.

Note that typically, more than one source-destination pair will require global restoration when the threshold is passed. This fact enables to compute the optimal routes for these paths using offline techniques, which result in more optimal utilization of resources than may be achieved by the requirement for online response to new requests for connections (which is the case during the normal operation of the ring).

After each new route is established (by setting the switching elements along the path to support it), the network management entity diverts the traffic of the connection at its endpoints to the new route. Only after this process is complete, is the local management entity at nodes along the old route, notified to reset the flags FreeChan[B(i)] to True and to set the switching elements of B(i) to their default operation mode.

Using the backup channels for low-priority connections

When not used for backing up other connections, the backup channels can be used to carry other connections but of lower priority. These connections are termed "volatile" herein. In the event of a failure, this traffic will be discarded to allow the more important traffic from secure channels to be rerouted. To this end, the switching elements of backup channels cannot remain in their default operation mode (connecting each channel B(i) to the same channel on the next link), since they are configured to support the low priority traffic.

In order to quickly reconfigure these switching elements into default mode, one of the backup channels, say B(1), is reserved for failure signaling, and is not used for low priority traffic. The switching elements of channel B(1) along the ring are always in default operation mode. Upon a failure, the node that discovers it sends a special "beacon" signal on B(1), which is propagated around the ring. Upon detecting that this channel is not quiet (by means of a sensor as described in the previous section), each node configures all its backup channels into default mode. (This default mode connects the input and output of the backup channels in a parallel manner: each channel B(i) on one incident link is connected to B(i) on the other incident link). See 303 of FIG. 3A and FIG. 4A.

Referring to FIG. 5A, switches 202 of backup channels are not configured in the default mode, except for those of channel B(1). Other backup channels are used to carry volatile connections 403. Referring to FIG. 5B, upon failure of link BC, both nodes B and C detect the event and send beacon signals 404 on channel B(1). As a result, the processor in each node detects the signal and resets all the B(i) switches to the default mode. This destroys all the volatile connections 403. Next, referring to FIG. 5C, the switches of nodes adjacent to a failure are reconfigured as described in the previous section and the backup connections 402 are established.

References

[1] F. J. Janniello, R. A. Neuner, R. Ramaswami, and P. E. Green, "Multi-protocol optical fiber multiplexer for remote computer interconnection," in *OFC'95 Tech. Digest*, 1995.

Having thus described our invention, what we claim as new and desire to secure by Letters Patents is:

1. A fault tolerant ring network comprising:
   (a) a plurality of links, each link having N channels, with a first subset of said N channels allocated for fault tolerant data channels and with a second subset of said N channels allocated for backup channels, where for each channel i in said first subset there is a backup channel B(i) in said second subset;
   (b) means for detecting a failure of at least one channel on any one of said links; and
   (c) a plurality of nodes, each node connected to a pair of links referred to as incident links, each node having a switch which will be configured as follows:
      i. when there is no failure of channel i on any one of said each node's incident links, said switch will be configured to interconnect a port for channel B(i) on one of said each node's incident links to a port for channel B(i) on the other of said each node's incident links, and
      ii. when there is a failure of channel i on one of said each node's incident links, which is detected by said means for detecting a failure, said switch being configured to connect a port for channel i on one of said each node's incident links to a port for channel B(i) on another of said each node's incident links, wherein any circuit connection using a failed channel i on one of said links will be restored using B(i) on another of said incident links.

2. An apparatus as recited in claim 1, wherein B is a single valued function mapping any channel i in said first subset to a unique channel in said second subset.

3. An apparatus as recited in claim 1, wherein each switch of each node has limited switching capability where at each switch can only be configured as follows:
   (a) any port for channel B(i) of said second subset on one of each nodes said incident links can only be connected to a port i in said first subset on another of each node's said incident links, or to port B(i) on said other incident link,
   (b) any port for channel i of said first subset is connectable to any port of said N channels on any of said incident links.

4. A fault tolerant multichannel ring network as recited in claim 1, wherein each of said nodes has a pair of multiplexers, one multiplexer for each link of said pair of incident links, wherein each of said multiplexers has a channel line card for each of said N channels on a corresponding one link of said pair of incident links, and wherein channels of one incident link are connected to channels of another incident link of said pair by connecting ports of corresponding line cards through said switch of said each node.

5. A fault tolerant multichannel ring network as recited in claim 4, wherein said multiplexers are wavelength division multiplexers.

6. In a communications ring having a plurality of nodes and a plurality of links, with each of said nodes connected to a pair of incident links for connecting it to two other of said nodes; each of said links having N communication channels, each node having a switch for interconnecting channels on one of its incident links to channels on another of its incident links, a method of providing fault tolerance in said ring, said method comprising:

(a) allocating a first subset of said N channels in each of said links as fault tolerant data channels;

(b) allocating a second subset of said N channels in each of said links as backup channels;

(c) configuring each switch of each node as follows:
  i. for each node where there is no failure in any channel of its incident links, connecting channels B(i), of said second subset, on one of said each node's incident links to channel B(i) on another of said each nodes incident links, and
  ii. for a node where there is a failure of channel i on one of its incident links, connecting channel i on said one link to channel B(i) on another of said incident links of latter said one node.

7. A method as recited in claim 6, wherein each of said nodes sets a flag indication for each channel of said second subset to indicate whether said each channel is available to be used as a backup channel for a failed channel in said first subset.

8. A method as recited in claim 6, wherein each of said nodes senses each channel of said second subset to determine whether said each channel is currently available to be used as a backup channel for a failed channel in said first subset.

9. A fault tolerant ring network comprising:

(a) a plurality of links, each link having N channels, with a first subset of said N channels allocated for fault tolerant data channels and with a second subset of said N channels allocated for backup channels, where for each channel i in said first subset there is a backup channel B(i) in said second subset;

(b) means for detecting a failure of at least one channel on any one of said links; and (c) a plurality of nodes, each node connected to a pair of links referred to as incident links, each node having a switch which will be configured as follows:
  i. when there is a failure of channel i on one of said each node's incident links, which is detected by said means for detecting a failure, said switch of said one node being configured to connect a port for channel i on one of each node's incident links to a port for channel B(i) on another of said each node's incident links, each said switch of each other of said nodes being configured so that channel B(i) of one incident link is connected to channel B(i) on another incident, and
  ii. when there is no failure of channel i on one of said each node's incident links, said switch will be configured to interconnect a port for channel B(i) on said one incident link of said each node to a port for a channel in said second subset of channels on the other of said each node's incident links, wherein any circuit connection using a failed channel i on one of said links will be restored using channel B(i) on the other of said incident links; and wherein any channel B(i) in said second subset is used for low priority traffic when there is no failure of channel i in said first subset.

10. A fault tolerant ring network as recited in claim 9, wherein one of said channels of said second subset is a failure signaling channel for notifying nodes of said ring of a failure so that nodes reconfigure themselves to connect each channel B(i) on one incident link to a channel B(i) on another incident link on each of the nodes when there is a failure of channel i of said first subset.

11. A fault tolerant ring network as recited in claim 9, wherein each of said nodes sets a flag indication for each channel of said second subset to indicate whether said each channel is available to be used as a backup channel for a failed channel in said first subset.

12. In a communications ring having a plurality of nodes and a plurality of links, with each of said nodes, connected to a pair of incident links for connecting it to two other of said nodes each of said links having N communication channels, each node having a switch for interconnecting channels on one of its incident links to channels on another of its incident links, a method of providing fault tolerance in said ring, said method comprising:

(a) allocating a first subset of said N channels in each of said links as fault tolerant data channels;

(b) allocating a second subset of said N channels in each of said links as backup channels;

(c) configuring each switch of each node as follows:
  i. when there is a failure of channel i on one of said each node's incident links, which is detected by said failure detection means, said switch being configured to connect a port for channel i on one of said each node's incident links to a port for channel B(i) on another of each said node's incident links, and
  ii. when there is no failure of channel i on one of said each node's incident links, said switch will be configured to interconnect a port for channel B(i) on said one incident link of said each node to a port for a channel in said second subset of channels on the other of said each node's incident links, wherein any circuit connection using a failed channel i on one of said links will be restored using channel B(i) on other of said incident links.

* * * * *